United States Patent [19]

Takei et al.

[11] Patent Number: 4,862,250

[45] Date of Patent: Aug. 29, 1989

[54] STILL PICTURE TRANSMITTING AND RECEIVING SYSTEM

[75] Inventors: Masahiro Takei, Yokohama; Tsuguhide Sakata, Machida; Tomishige Taguchi, Urawa; Somei Kawasaki, Tokyo, all of Japan

[73] Assignee: Canon Kabushiki Kaisha, Tokyo, Japan

[21] Appl. No.: 303,974

[22] Filed: Jan. 30, 1989

Related U.S. Application Data

[63] Continuation of Ser. No. 916,221, Oct. 7, 1986, abandoned.

[30] Foreign Application Priority Data

Oct. 8, 1985 [JP] Japan .................................. 62-224501

[51] Int. Cl.$^4$ ............................................ H04N 11/06
[52] U.S. Cl. ........................................ 358/12; 358/78; 358/14
[58] Field of Search ...................... 358/12, 13, 14, 78, 358/98, 312, 133, 323, 334, 30

[56] References Cited

U.S. PATENT DOCUMENTS

| | | | |
|---|---|---|---|
| 2,841,640 | 7/1958 | Bartelink | 358/12 |
| 3,518,360 | 6/1970 | Gibson et al. | 358/14 |
| 4,052,734 | 10/1977 | Jaeger | 358/12 |
| 4,335,393 | 6/1982 | Pearson | 358/12 X |
| 4,533,952 | 8/1985 | Norman, III | 358/22 X |
| 4,597,006 | 6/1986 | Orsburn | 358/22 |
| 4,646,166 | 2/1987 | Arlan | 358/310 |
| 4,658,284 | 4/1987 | Kawamura | 358/310 X |
| 4,713,684 | 12/1987 | Kawamura et al. | 358/78 |
| 4,739,397 | 4/1988 | Hayashi | 358/80 |
| 4,743,959 | 5/1988 | Frederiksen | 358/12 X |
| 4,802,003 | 1/1984 | Takei et al. | 358/133 |

Primary Examiner—James J. Groody
Assistant Examiner—Victor R. Kostak
Attorney, Agent, or Firm—Robin, Blecker & Daley

[57] ABSTRACT

Disclosed is a transmitting and receiving system including a picture transmitting apparatus for transmitting still picture signal information from the transmitting side to the receiving side, in which before the transmission of the still picture information, mode information representing a combination of transmitted color information is added, and a receiving apparatus capable of properly controlling a receiving operation according to the mode information.

20 Claims, 4 Drawing Sheets

STILL PICTURE TRANSMITTING AND RECEIVING SYSTEM

This application is a continuation of application Ser. No. 916,221, filed Oct. 7, 1986 now abandoned.

BACKGROUND OF THE INVENTION

1. Field of the Invention:

The present invention relates to a still picture transmitting and receiving system for transmitting video signal information such as a TV signal via a telephone line and the like.

2. Description of the Related Art:

Quite recently, a system has been devised according to which a TV signal is transmitted by making use of a telephone line or the like and is printed on a light sensitive paper or by a video printer or the like. FIG. 1 shows the system as a whole.

1 is a rotating magnetic sheet, and 2 is a motor for driving the sheet 1. A reproducing head 3 is arranged on the rotating magnetic sheet 1 to reproduce a still picture for one field or frame. The reproduced signal is inputted in a reproduced video processing circuit 4 to be converted into a form such as of an NTSC signal or a line sequential signal. This video signal is displayed by a monitor 5 and at the same time inputted into an RGB matrix 6. In the RGB matrix 6, the reproduced video signal is matrix-processed to obtain each component of R, G, B. Further, these signal components are processed with a complementary color conversion, a γ-correction, masking and so on at a video signal processing circuit 7.

An output of the video signal processing circuit 7 is converted into a digital value by an A/D converter 8, and quantized into, for example, 8 bits, namely the level of 256 steps. The respective data of Yl, Mg, Cy are stored in a frame memory 9 in sequence by every operation to be explained later, and are read out according to a transmitting rate of a transmission line K. At this time, the above data is added to a phase synchronizing signal at a transmitted signal forming circuit 10 so that a printing at the receiving side can be carried out at the same timing.

11 constitutes a transmitter, whose output is transmitted to the receiver via the transmission line K.

At the receiving side, the transmitted data is once stored in a frame memory 12, sequentially D/A converted by a D/A converter 13 into analog signals of Yl (yellow), Cy (cyan) and Mg (magenta), and displayed by a monitor 16 via an NTSC encoder 15. The signals are at the same time delivered to a printer 14. In the printer 14, each color component obtained from Yl, Cy, Mg signals serves to control, for example, the amount of ink in the case of an ink jet printer when a light sensitive material is exposed.

So far, in the case where color signals are to be transmitted, all three of Yl, Cy, Mg have been explained. However, in practice, at times an under-color is eliminated from the three complementary color signals to form a black print, and these color signals are transmitted, being newly added with Bk (black). Further, video signals nals reproduced especially from the magnetic sheet explained above are line sequential signals as the result of standardization, so that they are not a combination of three complementary colors or three complementary colors and one black print, but can assume other combinations. Further, not only in case where color video signals are transmitted but also in case where monochrome signals are transmitted, distinction between the transmitting rates such as for high speed or low speed might be necessary for the printer.

Until now, when such a distinction is needed, a transmitting mode is verbally communicated to the receiving side, for example, by telephone in advance of transmission, while at the receiving side a receiving state is manually set according to the transmitting mode communicated in advance. Therefore, the operation is complicated and inconvenient.

Further, in the case of a normal facsimile apparatus, a technique is that information of a transmitting mode is communicated to the receiving side in advance so as to automatically set the receiving side according to such transmitting mode. However, such technique is not known in an apparatus for transmitting and receiving a color video signal.

SUMMARY OF THE INVENTION

It is, accordingly, a first object of the present invention to eliminate the above-mentioned conventional difficulties.

Further, it is a second object of the present invention to provide a transmitting and receiving system in which whichever transmitting mode is selected by a transmitting side having a plural number of transmitting modes for transmitting a color video signal, a superior receiving operation corresponding to the set transmitting mode can be obtained at a receiving side.

Further, it is a third object of the present invention to provide a transmitting and receiving system in which a selected mode can be detected in advance at the receiving side.

To attain these objects, according to a preferred embodiment of the present invention, a picture transmitting apparatus for transmitting still picture signal information from the transmitting side to the receiving side is arranged to transmit mode information showing a combination of the transmitting color information being added before the still picture information. According to such mode information, an operation at the receiving side is well controlled.

Further objects and features of the present invention will become apparent from the following detailed description of the preferred embodiments thereof with reference to the accompanying drawings.

DETAILED DESCRIPTION OF THE PREFERRED EMBODIMENT

Figure 1:
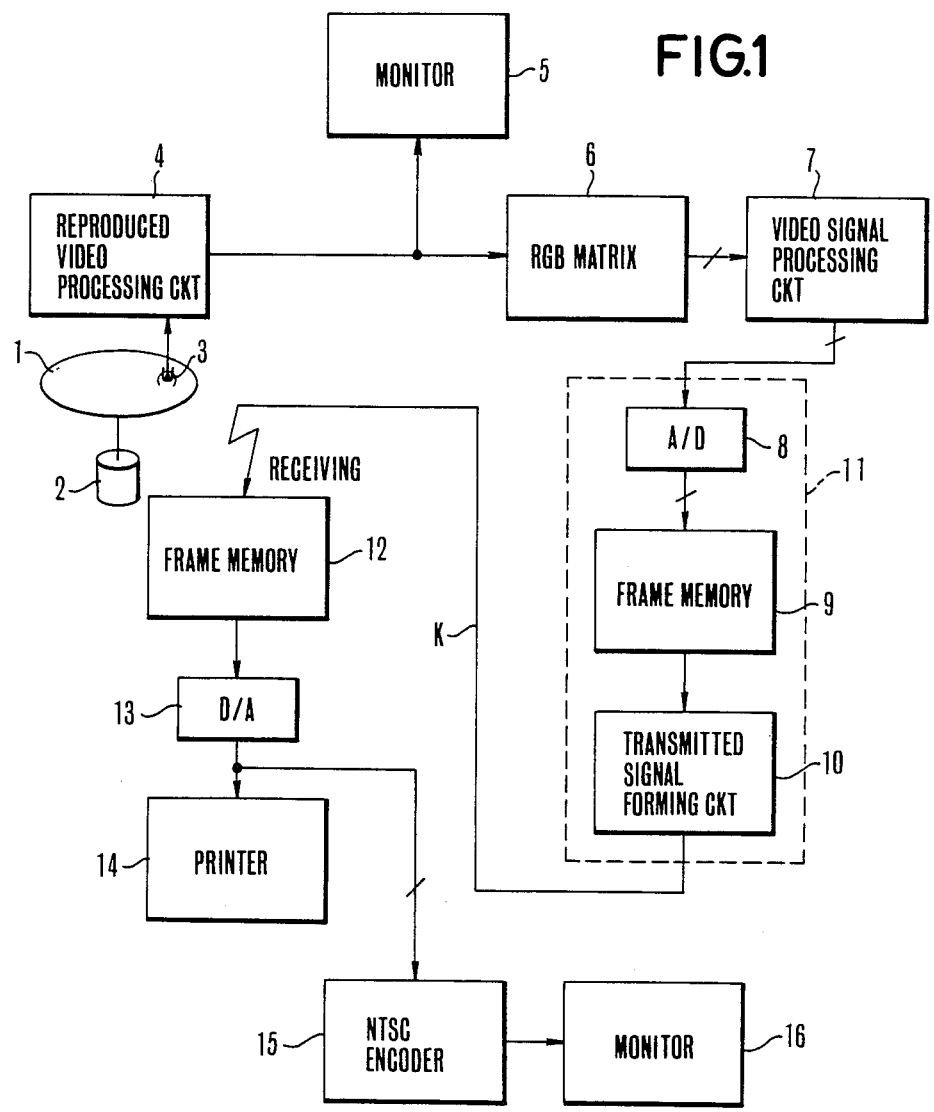
FIG. 1 shows a block diagram showing the construction of a transmitting and receiving system of the related art of the present invention as a whole.
Figure 2:
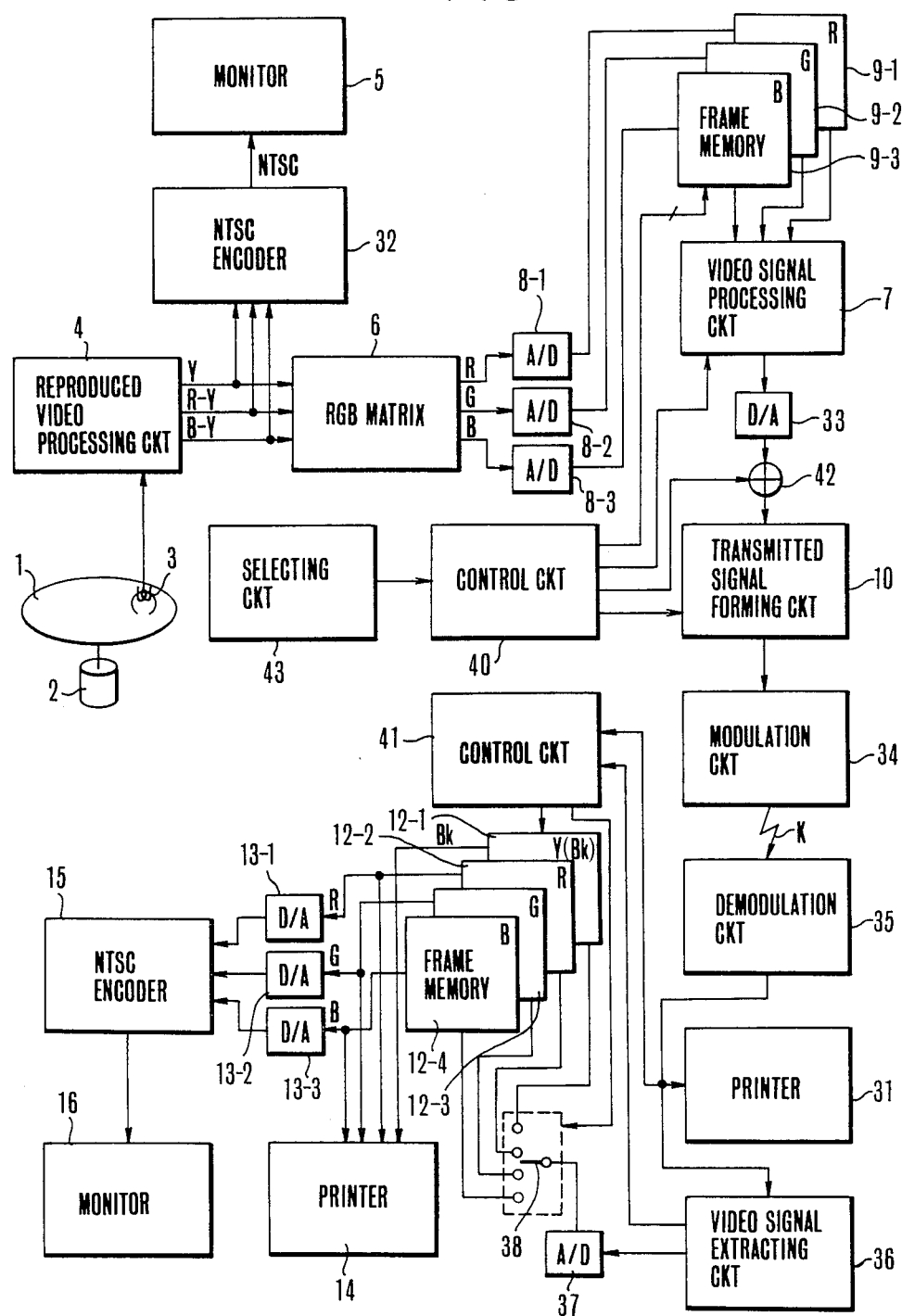
FIG. 2 shows a block diagram of an embodiment of the present invention as a whole.

FIG. 2 shows a block diagram of an embodiment of the present invention, in which elements having the same function as those in FIG. 1 are identified by the same numerals.

In FIG. 2, 1 is a rotating magnetic sheet, and 2 is a motor for driving the sheet 1. A reproducing head 3 is arranged on the rotating magnetic sheet 1, where a still picture for one field or frame is reproduced. A reproduced signal is input to a reproduced video processing circuit 4, where the signal is converted into a luminance signal Y and line sequential signals R−Y and B−Y. The luminance signal Y and the color difference signals R−Y and B−Y are delivered to an NTSC encoder 32 and an RGB matrix circuit 6. An NTSC signal formed by the NTSC encoder 32 is delivered to a monitor 5. At the RGB matrix circuit 6, the reproduced video signal is matrix-processed to obtain components R, G and B. The R, G and B signals are delivered to A/D converting circuits 8-1, 8-2 and 8-3 to be converted into, for example, digital signals for 8 bits. The digitally converted R, G and B signals are respectively stored in frame memories 9-1, 9-2 and 9-3, each capable of storing data for one frame. At the time of transmission, the stored picture data are read from the frame memories 9-1, 9-2 and 9-3 by means of a control circuit 40 according to a transmission mode, that is, a transmission sequence selected by a selecting circuit 43. The read out picture data are delivered to a video signal processing circuit 7 so as to pass the picture processes, such as a complementary color conversion, a γ-correction, masking and the like. These picture processes are subject to an output form of the transmitted signal of, for example, a complementary color signal system such as an ink jet printer, a silver halide film exposure device. In the video signal processing circuit 7, for example, Yl (yellow), Mg (magenta) and Cy (cyan) are obtained from each color signal R, G, B, according to the following relations:

$$Yl = -\log_{10} R^\gamma = -\gamma \log_{10} R$$

$$Mg = -\log_{10} G^\gamma = -\gamma \log_{10} G$$

$$Cy = -\log_{10} B^\gamma = -\gamma \log_{10} B$$

In short, the complementary color conversion and the γ-correction are carried out according to the above relations, and further masking process is carried out according to the following relation:

$$\begin{pmatrix} Yl' \\ Mg' \\ Cy' \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} Yl \\ Mg \\ Cy \end{pmatrix}$$

Hereby, $a_{ij}$ (i, j=1−3) are masking coefficients, whose values are properly chosen depending upon output means. These three kinds of the complementary color values are again converted from a complementary color to an original color. Furthermore, the signal data in a four colors mode to be explained later are four kinds of data Yl'', Mg'', Cy'' and Bk (black print data) which are converted from a complementary color to an original color. The data Yl'', Mg'', Cy'' and Bk are obtained from the above Yl', Mg' and Cy' by applying the following relations:

$$Yl'' = Yl' - Bk$$

$$Mg'' = Mg' - Bk$$

$$Cy'' = Cy' - Bk$$

where Bk is a value based upon the minimum values of Yl', Mg' and Cy'.

Further, in the case of a monochrome mode (luminance signal), the Y signal is calculated from R, G, B data by the control circuit 40 in the real time according to the following relation:

$$Y = 0.59G + 0.30R + 0.11B$$

An output video signal from the video signal processing circuit 7 is brought back into the analog signals by a D/A converter 33 and inputted to a transmitted signal forming circuit 10 in the next step.

In the transmitted signal forming circuit 10, a phase synchronizing signal and a reference level signal are added to the video signal according to an output from the control circuit 40 before the video information. Further, a data signal outputted from the control circuit 40 is added to the video signal by an adder 42. Hereby, the phase synchronizing signal is a signal for obtaining the horizontal synchronization of the transmitted video information, assuming a pulse wave form produced once for one horizontal period. While the phase synchronizing signal is produced, the phase of the apparatus at the receiving side is matched with that at the transmitting side.

The reference level signal is a signal corresponding to the maximum level of the video information, namely, a white level. At the transmitting side, the gain of the video information is adjusted according to this level.

Further, the data signal is a signal showing a transmitting mode, whose details will be explained later. Hereby, the control circuit 40 operates so as to read out data from the frame memories 9-1 - 9-3 according to the transmitting mode selected by the selecting circuit 43 and at the same time to add various kinds of signals in the above-mentioned way before the transmitting of the picture information.

Thus obtained phase synchronizing signal, reference level signal, data signal and video signal are delivered to a modulation circuit 34 to be modulated in amplitude or frequency into a signal form suited for the communication line, and then sent out to the communication line K.

The received signal obtained via the communication line K is demodulated by a demodulation circuit 35, and further the video signal excepting the above-mentioned phase synchronizing signal, reference level signal and data signal is extracted out by a video signal extracting circuit 36 in the next step and is delivered to an A/D converter 37, while the above-mentioned phase synchronizing signal and reference level signal are sent to a control circuit 41. Further, an output of the demodulation circuit 35 is also delivered to a printer 31 having an exposure efficiency and to be explained later referring to FIG. 4. The video signal outputted from the video signal extracting circuit 36 is converted into a digital signal by the A/D converter 37, and is properly sorted and stored in frame plane memories 12-1 - 12-4 via a switch 38 according to the transmitting mode. Hereby, the control circuit 41 changes over the switch 38 in such a manner that the Y signal or Bk signal is stored in the frame plane memory 12-1 and the R, G, B signals are stored in the frame plane memories 12-2 - 12-4, respectively. The stored video data are delivered to a printer 14 such as an ink jet printer and D/A converters 13-1 - 13-3. Outputs of the D/A converters 13-1 - 13-3 are delivered to a monitor 16 via an NTSC encoder 15 so as to see the received picture.

Hereby, the control circuit 41 includes a phase synchronizing signal pulse extracting circuit 18 and a mode detecting circuit 27 shown in FIG. 4 to be explained later, drives the memories 12-1 - 12-4 in synchronization with the phase synchronizing signal and changes over the switch 38 in the above-mentioned way according to the mode signal detected by the mode detecting circuit 27.

Figure 3:
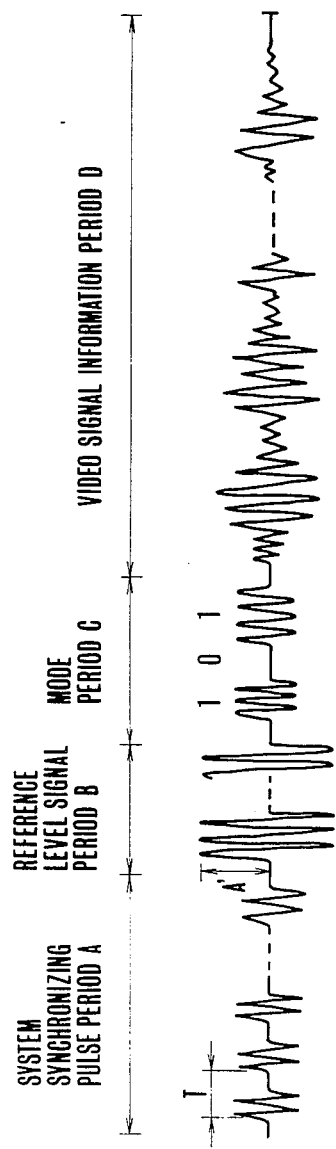
FIG. 3 shows the forms of signals to be transmitted via a transmitting line K shown in FIG. 2.

FIG. 3 shows a form, for example, the AM modulation of the above-mentioned transmitted signal. At first, the above-mentioned phase synchronizing signal A for system synchronization comes. In the case where the printer 31 is of the cylindrical exposure drum type constructed such that a recording is carried out on a positive or print paper wound around a rotating drum sequentially along the horizontal line, the synchronizing pulse appears in the interval of T, wherein T is a rotation frequency of a motor. During this period the rotating motor is phase-locked. Then, the above-mentioned reference level signal period B comes and the most white part of the picture is set at the most suitable level A', for example, 255 when it is quantized to 8 bits.

Then, the mode data period C comes. The relation, for example, between a print mode and codes can be represented in 3 bits as follows:

| Monochrome (Y) | 00X |
| Three colors (R, G, B) | 01X |
| Four colors (R, G, B, Bk) | 10X |
| S/V (G, R/B) | 11X |
| High speed (2X r.p.m. of exposure drum) | XX1 |
| Low speed (R.p.m. of exposure drum) | XX0 |

Hereby, X can be either 0 or 1. When the continuation time of these data for one bit is predetermined, the distinction of information for each bit can easily be detected by the presence of a carrier in AM modulation.

Then, during the picture period D, a picture signal for one frame appears continuously according to the transmitting rate. Consequently, in case a plural number of color informations is sent, this sequence is repeated a plural number of times.

The S/V mode will be explained here. The S/V mode is a mode in which a G signal is first transmitted and, next, a signal obtained by mixing an R signal and a B signal is transmitted. In more detail, since a luminance signal Y and line sequential color-difference signals R−Y and B−Y are recorded on the magnetic sheet in the form of a frequency-multiplexed signal as has been described above, the rates of the R signal and the B signal are relatively low. Accordingly, the G signal among signals produced by the frame memories 9-1 to 9-3 is first transmitted and, next, the R signal and the B signal are, for example, line-sequentially transmitted, so that the time required for transmission can be shortened as compared with the three colors mode and the four colors mode. In this case, the conversion of the R signal and the B signal into line sequential signals is effected by the video signal processing circuit 7 reading out signals from the frame memories 9-1 to 9-3 in a predetermined sequence.

Figure 4:
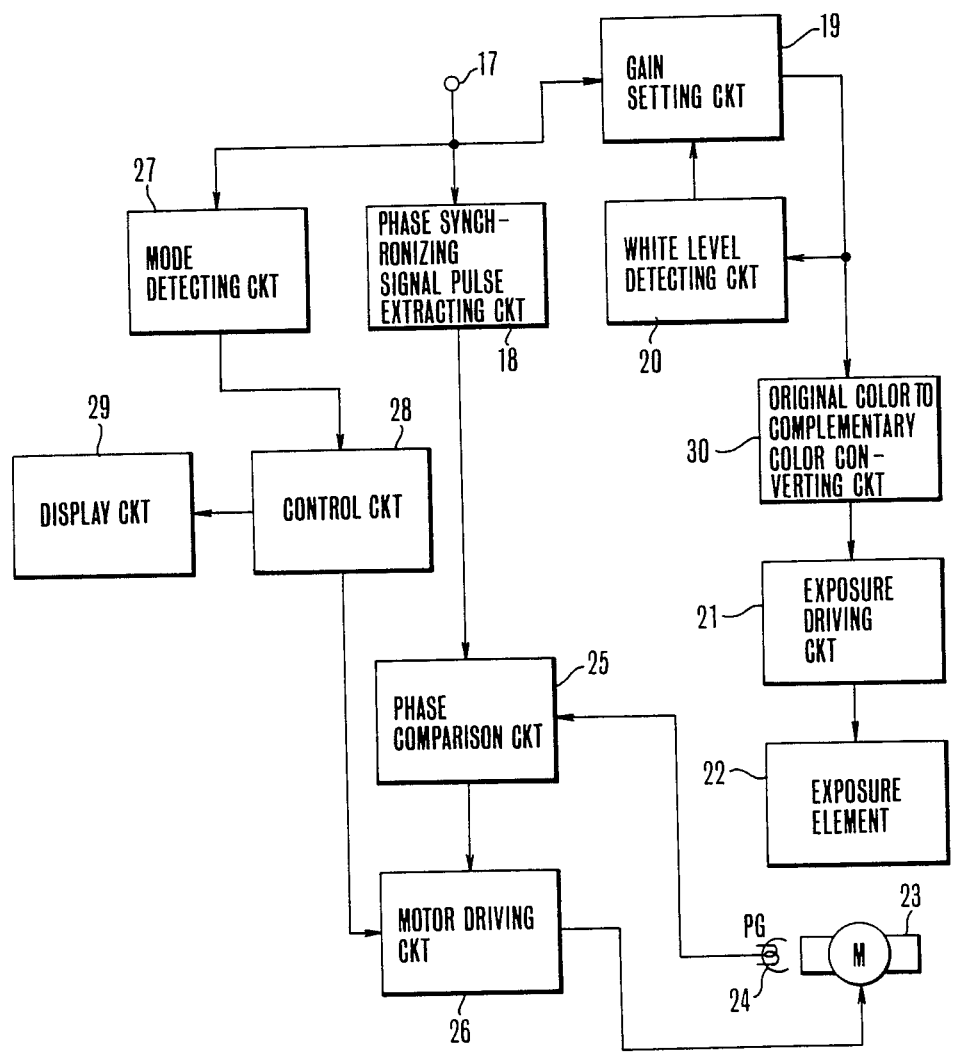
FIG. 4 shows a block diagram showing the construction of a printer in FIG. 2.

FIG. 4 shows a concrete block diagram of the printer 31 shown in FIG. 2.

From a terminal 17, a signal demodulated from the transmitted signal shown in FIG. 3 is input and led to the phase synchronizing signal pulse extracting circuit 18 and a gain setting circuit 19. An output of the gain setting circuit 19 is inputted to a white level detecting circuit 20 and an exposure driving circuit 21 via an original color to complementary color converting circuit 30. In the white level detecting circuit 20, the level A' during the white level signal period B in FIG. 3 is detected, and then the gain of the gain setting circuit 19 is set in such a manner that the video signal level of the following picture period becomes the maximum level, for example, 255 in case it is quantized to 8 bits. Thus obtained video signals are inputted to the exposure driving circuit 21 via the original color to complementary color converting circuit 30 so as to obtain the exposure amount in an analog signal. Lastly, this exposure amount is given to an exposure element 22 to expose a light sensitive surface of a light sensitive body put on the rotating drum driven by the motor 23.

Further, the synchronizing pulse with T period extracted by the phase synchronizing signal pulse extracting circuit 18 becomes one input signal to a phase comparison circuit 25, while the other input signal thereto is a pulse corresponding to the rotation phase obtained from a PG head 24 of the rotating drum. The phases of these two inputs are compared by the phase comparison circuit 25. A motor driving circuit 26 is controlled by an output corresponding to the thus obtained phase difference so as to drive the drum motor 23 in synchronization with the system synchronizing pulse.

The signal for a printing instruction inputted via the terminal 7 is also input to the mode detecting circuit 27. Hereby, the above-mentioned data, for example, of 3 bits are written in and distinguished. The extracted data is inputted to a control circuit 28 to give a display to the user by a display circuit 29 according to the mode. The control circuit 28 carries out the control in such a manner that the motor driving circuit 26 changes the rotation of the motor 23 according to the high or low speed mode.

In case of the above embodiment, the mode is judged by the two value data of "1" or "0" of 3 bits. However, it is only an example and the mode can also be judged by the amplitude value.

Further, hereby the kinds of the transmitted color signals are coded. However, it is also possible to code colors to be transmitted. By doing so, it is possible to eliminate the mistake of color setting at the time of printing.

Further, it is sufficient to put the transmitting mode only before the video signal of the first color. If at this time the sequence of the color signals is predetermined, the setting mistake of the color can be avoided. However, it is preferable to transmit the synchronizing signal and the maximum luminance signal every time.

Although in the case of the present embodiment, the mode information is added to each of a plural number of color signals, it is also possible to add the mode before the start of transmission.

Further, although hereby the transmitted video data are original color signals, it goes without saying that the video data can also be complementary color data.

As explained above, according to the present invention, since the mode signal such as of the transmitted color signal is transmitted to the receiving side, it is possible not only to enlarge the efficiency but also to obtain a sure printing at the receiving side.

What is claimed is:

1. A transmitting apparatus for transmitting color image information for forming such image in any one of plural transmitting modes in which combinations of color signals are different from each other, said apparatus comprising:
(a) color image supplying means for supplying a color image signal, said color image supplying means including means for reproducing the color image signal from a medium on which the color image signal is recorded;
(b) means for color-separating the color image signal supplied by said supplying means into three primary color signals;
(c) means for transmitting the primary color signals color-separated by said color separating means in a predetermined sequence;
(d) means for selection of any one of said plural transmitting modes to decide said predetermined sequence; and
(e) means for transmitting a signal indicative of said predetermined sequence selected by said selection means with said color image signal.

2. A transmitting apparatus according to claim 1, further comprising:
(a) means for storing primary color signals color-separated by said color-separating means.

3. A transmitting apparatus according to claim 1, wherein said transmitting means includes means for modulating said color image signal.

4. A transmitting apparatus according to claim 3, wherein the signal indicative of said predetermined sequence is modulated by said modulating means.

5. A transmitting apparatus for transmitting color image information for forming such image in any selected one of plural transmitting modes, said apparatus comprising:
(a) means for transmitting the color image information according to any selected one of a plural number of transmitting modes in which combinations of color signals are different from each other and in which each of the transmitting modes is a mode for transmitting an image of one picture plane; and
(b) means for transmitting mode information indicative of a selected one of said transmitting modes with the transmitting of the color image information by said transmitting means.

6. A transmitting apparatus according to claim 5, further comprising:
means for producing the color image information to be transmitted by said transmitting means.

7. A transmitting apparatus according to claim 6, wherein said producing means includes:
means for reproducing a color image signal from a medium on which the color image signal is recorded.

8. A transmitting apparatus according to claim 6, wherein said producing means is a means for producing said color image information to be transmitted as color-separated signals.

9. A receiving apparatus for receiving color image information with mode information indicative of a transmitting mode selected from a plurality of transmitting modes in which combinations of color signals are different from each other and in which each of the transmitting modes is a mode for transmitting an image of one picture plane, comprising:
(a) means for storing a received color image signal; and
(b) control means for controlling the store state of said storing means according to said mode information.

10. A receiving apparatus according to claim 9, wherein color image information is a signal to be color-separated and received for each color component in sequence.

11. A receiving apparatus according to claim 9, further comprising:
(a) means for reading out the color image signal stored by said storing means and for delivering the signal to a monitor.

12. A transmitting apparatus for transmitting a color image signal comprising:
(a) color image signal producing means for producing the color image signal;
(b) storing means for color-separating the color image signal produced by said producing means and for storing the signal by each color signal; and
(c) transmitting means for transmitting the color image signal stored by said storing means, said transmitting means having a first mode for transmitting the signal by each color signal and a second mode for composing said color signals and transmitting them.

13. A transmitting apparatus according to claim 12, wherein said second mode is a mode for transmitting a signal to which the color signals stored by said storing means by each color signal are added at a predetermined ratio.

14. A transmitting apparatus according to claim 13, wherein said color signals are signals color-separated into each color component of R, G, B.

15. A transmitting apparatus according to claim 14, wherein said predetermined ratio is 0.59:0.30:0.11.

16. A transmitting apparatus for transmitting a color image signal comprising:
(a) color image signal producing means for producing the color image signal;
(b) storing means for color-separating the color image signal produced by said producing means and for storing the signal by each color signal, and
(c) transmitting means for transmitting the color image signal stored by said storing means, said transmitting means having a first step of transmitting the signal stored by said storing means without composing the signal and a second step of composing the signal stored by said storing means and transmitting the composed signal.

17. A transmitting apparatus according to claim 16, wherein said storing means is a means for color-separating the color image signal into R, G and B color signals and for storing the video signal for each of the color signals.

18. A transmitting apparatus according to claim 17, wherein said first step is a step of transmitting the G signal.

19. A transmitting apparatus according to claim 17, wherein said second step is a step of composing the R signal and the B signal and transmitting the composed signal.

20. A transmitting apparatus according to claim 19, wherein said second step is a step of transmitting the R signal and the B signal line-sequentially.

* * * * *